United States Patent

[11] 3,581,480

| [72] | Inventors | William H. O'Connor, III;<br>Edwin J. Weber, both of Baltimore, Md. |
|---|---|---|
| [21] | Appl. No. | 864,278 |
| [22] | Filed | Sept. 30, 1969 |
| [45] | Patented | June 1, 1971 |
| [73] | Assignee | The Black and Decker Manufacturing Company<br>Towson, Md. |

[54] MULTIPLE-FUNCTION RECEPTACLE AND INTERCONNECTING PLUGS THEREFOR
25 Claims, 10 Drawing Figs.

[52] U.S. Cl. ................................................ 56/11.9
    56/249, 339/32, 339/184
[51] Int. Cl. ........................................... A01d 35/24,
    H01r 27/00
[50] Field of Search ............................................ 56/26, 25.4,
    249; 174/50, 53; 339/176, 177, 191, 192, 195,
    196, 31 R, 31 B, 31 M, 32 R, 32 M, 33, 184, 186 R,
    184 L, 184 T, 184 M, 186 M, 186 T

[56] References Cited
UNITED STATES PATENTS

| 1,755,166 | 4/1930 | Cannon | 339/193N |
| 2,444,046 | 6/1948 | Jacobs | 339/195XR |
| 2,792,559 | 5/1957 | Maberry | 339/32R |
| 3,077,066 | 2/1963 | Nokes | 56/26 |
| 3,139,492 | 6/1964 | Cage, Jr. | 339/31M |
| 3,210,578 | 10/1965 | Sherer | 339/32M |
| 3,271,939 | 9/1966 | Granger, Jr. et al. | 56/26 |

Primary Examiner—Russell R. Kinsey
Attorneys—Leonard Bloom and Joseph R. Slotnik ABSTRACT: A receptacle to which the cutter drive motor and battery of a cordless electric lawn mower are connected, the receptacle having obstructing members arranged in a selected pattern. Plugs are also provided for interconnection therewith, the plugs having corresponding obstructing members so that connectors in the plugs can engage connectors in the receptacle only when the members are arranged in nonabutting relationship. In the specific application to a lawn mower, one plug is provided for making connection between the mower and the battery in either a forward or reverse manner so as to provide the mutually exclusive functions of mowing and sharpening. Another plug is provided for connecting the battery to a recharging unit while simultaneously preventing the user from attempting to drive the motor during the recharging operation.

PATENTED JUN 1 1971

INVENTORS
WILLIAM H. O'CONNOR III
EDWIN J. WEBER

BY *Edward P. Murphy*

ATTORNEY

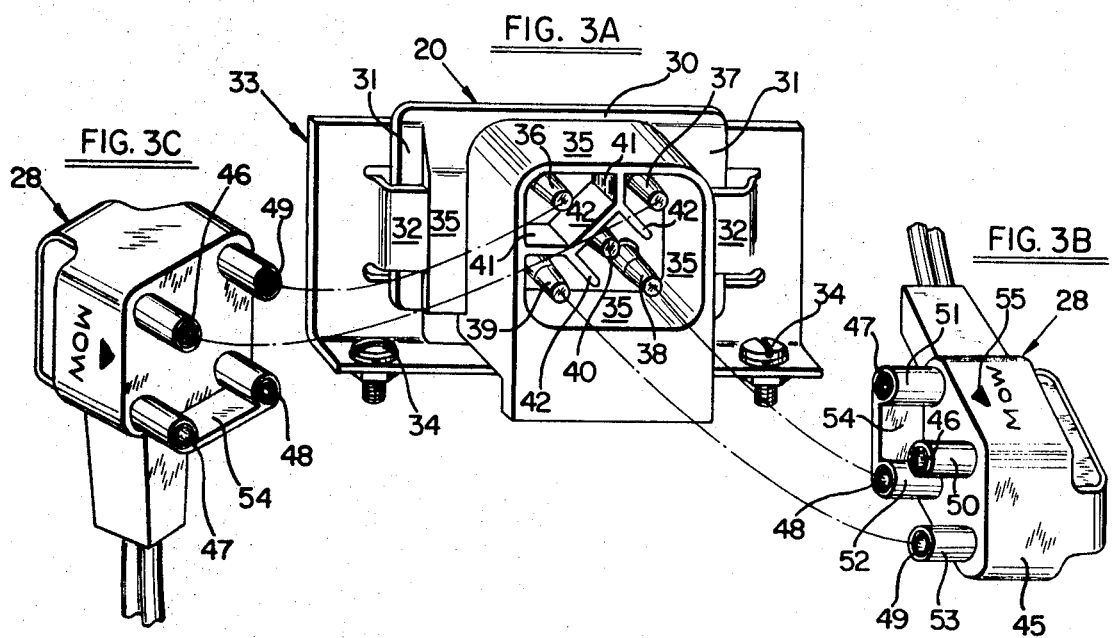
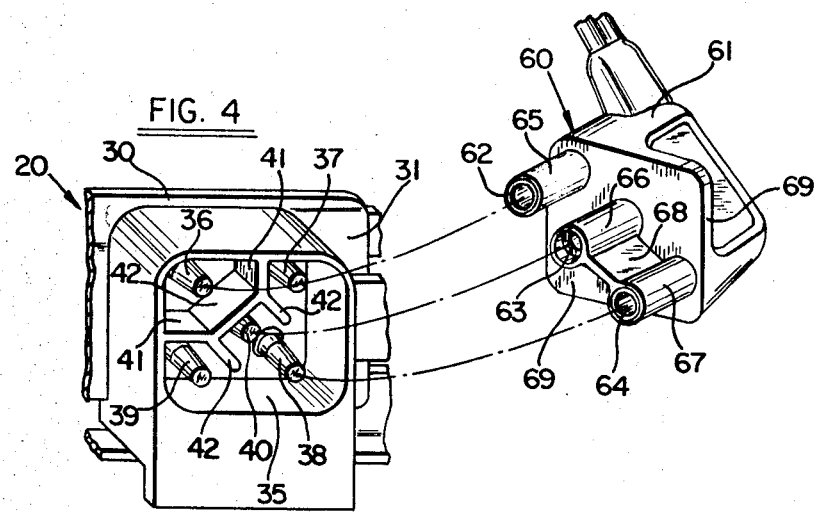

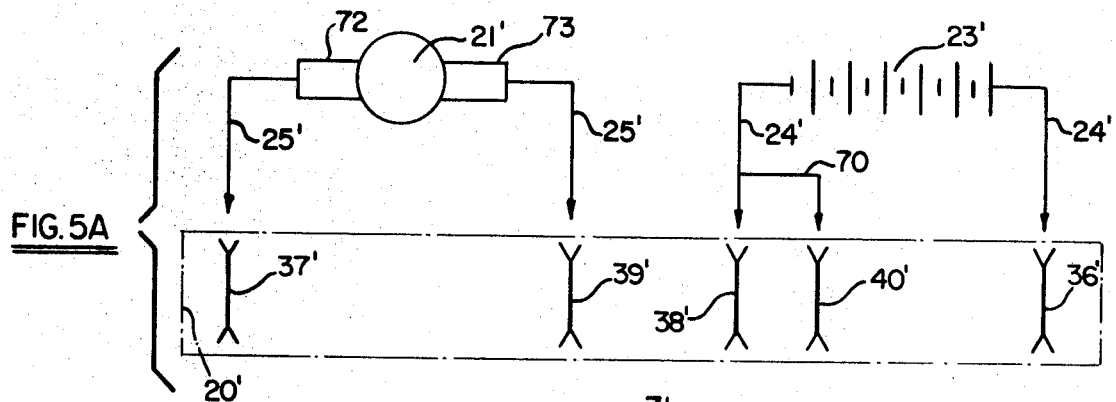
FIG. 5A
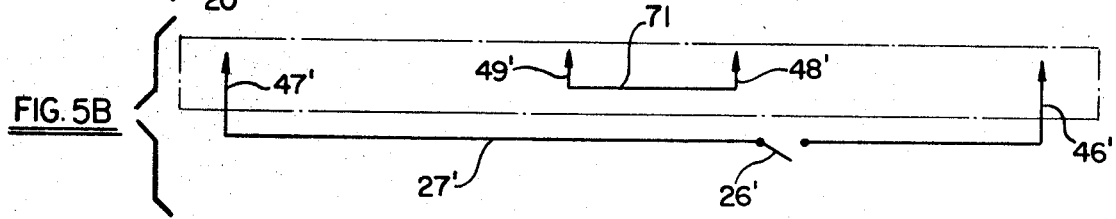
FIG. 5B
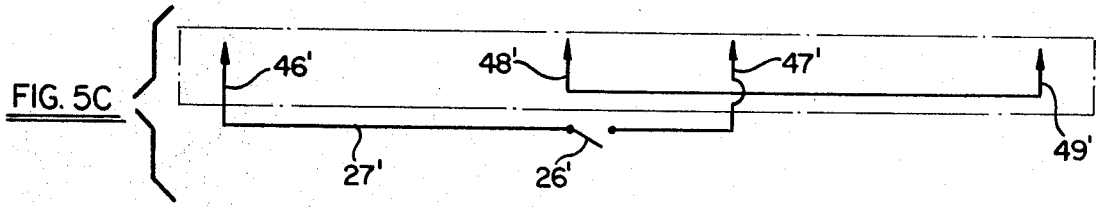
FIG. 5C
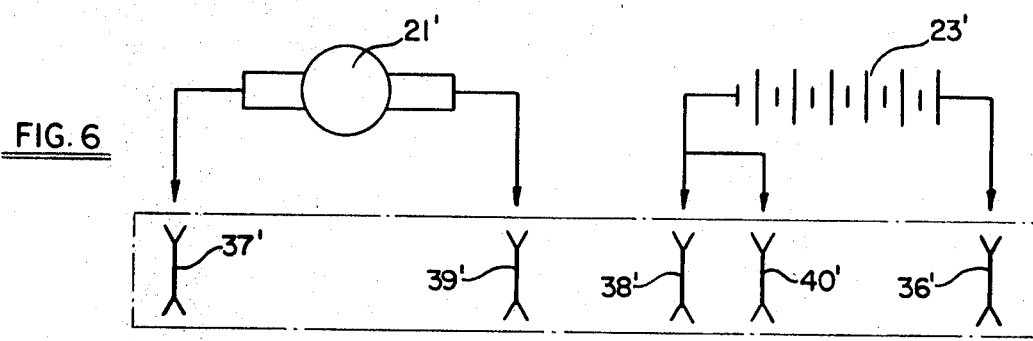
FIG. 6
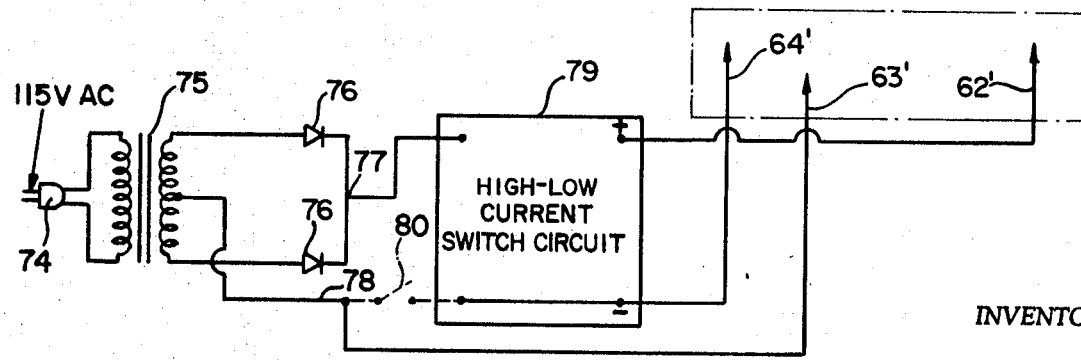
INVENTORS
WILLIAM H. O'CONNOR III
EDWIN J. WEBER
BY Edward D. Murphy
ATTORNEY

MULTIPLE-FUNCTION RECEPTACLE AND INTERCONNECTING PLUGS THEREFOR

This invention relates to a multiple-function receptacle and to a plurality of mutually exclusive plugs for interconnection therewith. The combination disclosed herein is specifically intended for use in a cordless electric lawn mower wherein one of several functions to be performed is selected by the combination of plug and receptacle and the potentially damaging simultaneous performance of more than one function is prevented thereby.

A cordless electric lawn mower intended for general consumer use must be designed for maximum possible convenience in use. In addition, it must be protected against users who may be careless about or unaware of the damage that may be caused by incorrect usage. Specifically, in such a mower which includes the functions of mowing, sharpening, and recharging, the mower should be arranged so that only one of these functions can be performed at a time. It is also of primary importance that a simple method be provided so that the operator can disconnect the motor completely from the power source while he is working near the blades.

In accord with this invention, this is accomplished by providing a receptacle to which plugs are connected in various positions to define the function to be performed. Since the receptacle is blocked by the insertion of a plug in a particular position, it is not possible for a user to attempt two functions simultaneously in normal usage.

Accordingly, it is an object of this invention to provide a cordless electric lawn mower including means for exclusively defining the function to be performed.

Another object of this invention is to provide a cordless electric lawn mower which incorporates convenient means for converting the mower from one mode of operation to another.

It is also an object of this invention to provide a cordless electric lawn mower which includes apparatus for enabling sharpening of the cutting blades.

Another object of this invention is the provision of a receptacle adapted to receive interconnecting plugs in a variety of mutually exclusive positions.

A further object of this invention is the provision of a system of receptacle and matching plugs which can be interconnected in a variety of ways to define different products of electrical interconnection.

Briefly, in accord with a specific embodiment of this invention, a receptacle is provided to which the motor and battery of a cordless electric lawn mower are connected, the receptacle having obstructing members arranged in a selected pattern. Plugs are also provided for interconnection therewith, the plugs having corresponding obstructing members so that connectors in the plugs can engage connectors in the receptacle only when the members are arranged in nonabutting relationship. In the specific application to a lawn mower, one plug is provided for making connection between the mower and the battery in either a forward or reverse manner so as to provide the mutually exclusive functions of mowing and sharpening. Another plug is provided for connecting the battery to a recharging unit while simultaneously preventing the user from attempting to drive the motor during the recharging operation.

The novel invention which is intended to be covered hereby is defined in the intended claims. An understanding of the invention, together with further objects and advantages thereof, may be obtained from a consideration of the following description, taken in conjunction with the accompanying drawings in which:

FIG. 3A is a perspective view of a receptacle in accord with the present invention;

FIGS. 3B and 3C are respective perspective views of a plug adapted to interconnect with the receptacle of FIG. 3A in two illustrated positions;

FIG. 4 is a perspective view of a recharger plug adapted for interconnection with the receptacle of FIG. 3A;

FIGS. 5A, 5B and 5C are schematic illustrations corresponding to FIGS. 3A, 3B and 3C, with the addition of the circuits connected thereby; and FIG. 6 is a schematic view of a recharging circuit and of the plug and receptacle of FIG. 4.

Figure 1:
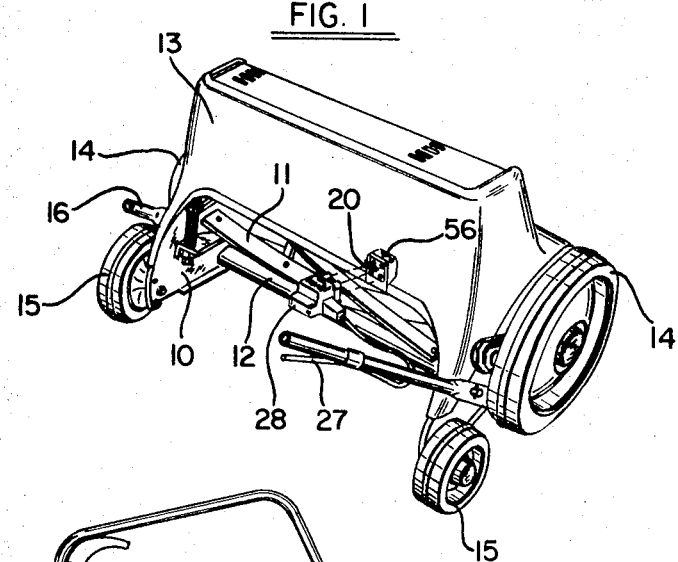
FIG. 1 is a perspective view of the rear of a mower incorporating the system of this invention.

In FIG. 1, a mower is illustrated which comprises a frame 10 which carries a cutting reel 11, a bed knife 12, and a housing or shroud 13 which encloses a motor and a rechargeable battery, not shown. The mower is supported by wheels 14, 15 which are mounted to the frame 10 via axles. A handle 16 provides for operator control.

In accord with this invention, a receptacle 20 is located at the back of the housing. The receptacle includes a group of connectors which are connected to the motor and battery by wires located inside the housing. Also in accord with the present invention, the selection and positioning of a plug fitted into this receptacle defines the function which the mower is to perform exclusively, so that the operator can not, in normal usage, connect these items for the simultaneous performance of multiple functions. As an additional feature, this allows the switch to be mounted on the handle while still providing for convenient removal, if desired, for storage, etc.

Figure 2:
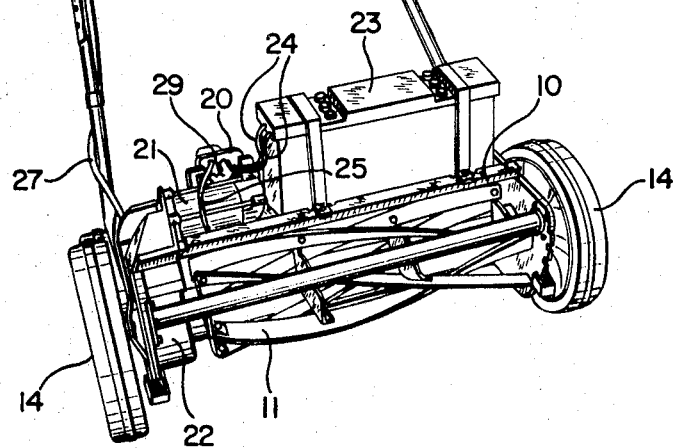
FIG. 2 is a perspective view of the front of the mower with the housing removed.

FIG. 2 is an illustration of the mower of this invention from the front with the shroud removed. The motor 21 is coupled to the reel 11 by gears in a gear case 22 and the battery 23 is carried by the frame 10. The battery is connected via wires 24 to the receptacle through a plug 29 and the motor is also connected to the receptacle by wires 25, only one of which is visible in this figure. The motor is mounted on the gear case 22 which is mounted on the frame 10.

A switch 26 is mounted on the upper end of the handle 16 and is connected by a cable 27 to a switch plug 28, shown in FIG. 1. The switch plug, cable and switch provide for interconnection of the motor to the battery according to the relative positions of the switch plug and the receptacle.

FIG. 3A is a perspective view of the receptacle 20. As can be seen in this figure, the receptacle comprises an insulating body 30 having flanges 31 which are gripped by tabs 32 on a bracket 33 which is mounted on the frame 10 of the mower via bolts 34. The insulating body of the receptacle also includes sidewalls 35 which define a reentrant opening in which is disposed an array of metallic connectors 36—40 which extend thru the body 30.

In a particular arrangement, the connectors 36—39 are arranged in a four-sided array with one connector 40 located in the center. The receptacle body also includes, as inward extensions of two of the sidewalls 35, a pair of raised portions 41 which are positioned in two sides of the array, and inner raised portions 42 which separate the central connector 40 from the outer connectors. Thus, two sides of the array are left open, the other two being interrupted by raised portions 41 transverse to the sides of the array while the inner connector 40 is separated from all the connectors in the sides except one, 38, by raised portions 41 and 42 which are transverse to a line between the inner connector and the corner connectors.

FIG. 3B is a perspective view of the switch plug 28 of this invention which is adapted, as illustrated by the dashed lines, for engagement with the receptacle 20. The switch plug comprises an insulating body 45 having a plurality of female connectors 46—49 extending therefrom, each of the connectors being surrounded by extensions 50—53 of the insulating material. It is noted that the positions of the connectors 46—49 correspond to those of the outer connectors 36—39 in the receptacle. A lateral extension 54 of the insulators 51, 52 surrounding two of the connectors 47, 48 is also provided which comprises a raised portion of insulating material extending parallel to one side of the array of connectors. Accordingly, the plug 28 can only be inserted into the receptacle 20 when the side portion 54 is aligned with one of the sidewalls 35 which does not have an inward extension 41 since, in either of the other positions, the raised portions abut before the connectors make contact.

In the position illustrated in FIG. 3B, the word "mow" is uppermost on the plug and the pointer 55 is aligned with a corresponding pointer 56, on the housing of the mower which is shown in FIG. 1. The alternative position of the plug 28 is shown in FIG. 3C. In this position, the pointer 55 is aligned with pointer 56. Because of the raised portions 41 and 54, this is the only other position in which the plug will fit the receptacle; thus, no other indicator is required.

In the position of FIG. 3C, the plug 28 will connect different connectors than that of FIG. 3B. Specifically, in the mower of this invention, the connectors 36—39 and 46—49 are arranged so that the motor and battery are interconnected in reverse in FIG. 3C and the reel then runs backwards and the blades, if first tightened and coated with grinding compound, sharpen themselves against the bed knife. In both cases, the system of this invention enables the user to select the function desired without any danger of accidentally making wrong connections or closing incorrect combinations of switches.

The third element of the system of this invention is the recharger plug 60, illustrated with the receptacle 20 in FIG. 4. This plug includes an insulating body 61 and three female connectors 62—64, each enclosed by extensions 65—67 of insulating material. The connectors 62—64 are respectively located at positions corresponding to the positions of the receptacle connectors 36, 40 and 38 and a raised portion 68 of the insulating material extends between the connectors 63 and 64. Thus, due to the raised portions 42 and 68, the recharger plug can be inserted in only one direction into the receptacle and incorrect connection, which might cause operation of the motor or discharge of the battery, is prevented. Also, because the recharger plug uses some of the same receptacle connectors as the switch plug 28, and because the remaining connectors are shielded by ears 69 on the body 61, it is not possible to operate the mower while the battery is being recharged.

FIGS. 5A, 5B and 5C illustrate schematically the electrical interconnections provided by the receptacle and plugs of FIGS. 3A, 3B and 3C. Since the items are the same as those previously illustrated except that the representation is schematic, the same numbers have been retained with primes added. Thus, in FIG. 5A, the motor and battery which were shown previously in FIG. 2 are identified as 21' and 23'. The wires 24' and 25' extend from the motor and battery to the rear portion of the receptacle 20', the negative side of the battery being also connected to a second receptacle connector by an extra conductor 70. The receptacle includes the five connectors 36'—40' which correspond to the metallic posts shown in FIG. 3A.

In FIG. 5B, the switch plug 28 is illustrated in the "mow" position as shown in FIG. 3B. Thus, the plug connectors 48' and 49' are now seen to be directly connected by a conductor 71 which is located in the plug while plug connectors 46' and 47' are connected to the leads in the cable 27' so that the circuit between them is closed upon operation of the switch 26'. Thus, in this plug position, when the switch 26' is operated, the positive pole of the battery is connected thru wire 24', connector 36', connector 46', cable 27' and switch 26' to connector 47' which is in turn connected thru receptacle connector 37' and wire 25' to one of the brushes 72 of the motor. Similarly, the brush 73 is connected thru the receptacle and plug to the negative pole of the battery. The motor is arranged so that, when the motor is connected in this polarity, the blades are driven in a cutting direction.

FIG. 5C represents the switch plug 28' in the other of its two possible positions, namely, that corresponding to FIG. 3C. In this position, it can be seen that the brush 72 is now connected to the negative pole of the battery while the brush 73 is connected to the positive pole of the battery. In this position, the motor and blades are driven in the reverse direction so that the blades strike against the bed knife for sharpening.

FIG. 6 illustrates the electrical connections when the battery is to be recharged. As shown, the receptacle connectors 37' and 39' which are connected to the motor are left open and are shielded by the extensions 69 of the recharger plug shown in FIG. 4. The recharger connectors 62', 63' and 64' are arranged to interconnect with the receptacle connectors 36', 38' and 40'. The recharger designed for use in this system includes a plug 74 which is adapted to be connected to a normal 115-volt AC line. The recharger includes a transformer 75 which provides a low-voltage AC signal which is rectified by the diodes 76. Thus, a DC voltage appears between junction 77 and lead 78 from the center tap of the transformer. This voltage is used to charge the battery; however, since it is contemplated that the battery will normally be left connected to the charger while in storage, it is necessary to provide a low-charging condition which will maintain the battery voltage without danger of overcharging. It is also contemplated, however, that the recharger will also be required to charge the battery within a relatively short time; accordingly, a high-current capability must also be provided. Therefore, a high-low current-switching circuit 79 is provided. For safety purposes, it is desirable that this circuit be designed to operate in the low-current mode unless a low-voltage condition is sensed in the battery. Accordingly, it is desirable to provide an arrangement whereby the battery is connected across the output of the charger before the charging circuit is activated. If the circuit is activated first, it will switch into the low rate mode and will not switch into the high rate even though a discharged battery is subsequently connected across its output.

A first approach to this problem could be to provide an on-off switch 80 in one of the input lines to the switching circuit. However, this requires an extra operation on the part of the user and this may be forgotten or it may be switched on before the battery is plugged in. Accordingly, in the interest of automatic, convenient operation, the common lead 78 is brought to the recessed terminal 64' of the charger plug where it is connected via connector 40', conductor 70, connector 38' and connector 64' to the common side of the switching circuit. The physical manner in which the connector 63 is recessed relative to the connectors 62 and 64 is shown in FIG. 4. As the recharger plug is inserted into the receptacle, the connectors 62' and 64' make contact first, thus conditioning the circuit to deliver a high current if the battery voltage is low. Then, as the plug 60 is moved to the fully inserted position, the connector 63' makes contact with the connector 40' whereupon the circuit is activated and the voltage output of the rectifiers 76 is applied to the battery. Thereafter, when the voltage of the battery reaches a predetermined level, the circuit switches into the low rate mode where it remains until the battery is removed and discharged thru use.

While one specific embodiment of this invention has been illustrated and described, it will be apparent to those skilled in the art that many changes and modifications may be made therefrom without departing from the broader aspects of this invention. Therefore, it is intended that the appended claims cover all such changes and modifications as fall within the true spirit and scope of this invention.

We claim:

1. A receptacle arranged for interconnection in a plurality of different ways comprising
    an insulating body member;
    a symmetric, multisided array of electrical connectors disposed in said member, said array including a set of contacts along said sides and at least one contact enclosed within said sides;
    said member including raised portions of insulating material located in some of said sides of said array;
    said member also including a raised portion substantially surrounding said inner contact except at a selected position;
    said raised portions acting to prevent engagement of one or more interconnecting plugs in other than the proper orientation.

2. The receptacle claimed in claim 1 wherein
    said member comprises a plurality of sidewalls defining a reentrant opening; and
    said connectors comprise a plurality of conductive elements disposed within said opening.

3. The receptacle claimed in claim 2 wherein said raised portions of said member in said sides of said array comprise wall segments extending inwardly from said sidewalls; and said raised portion surrounding said inner contact comprises a plurality of wall segments, one facing each intersection of said sidewalls except one.

4. The receptacle claimed in claim 3 wherein
said member includes four sidewalls;
said array includes five connectors, one disposed adjacent each intersection of said sidewalls, and one located at the center of said reentrant opening; and
said raised portions of said member comprise first wall segments extending perpendicularly from said sidewalls between two pairs of said connectors and second wall segments extending between said centrally located connector and three of the other connectors.

5. In combination, an electrical plug and receptacle adapted for mutual interconnection in two different relative positions wherein:
said receptacle comprises:
an insulating receptacle body member;
a symmetric, multisided array of electrical connectors disposed in said receptacle member;
said plug comprises:
an insulating plug-body member shaped to be engaged with said receptacle;
a plurality of electrical connectors in said plug member, said connectors being disposed in an array corresponding to that of said receptacle connectors; and wherein lockout means comprising mutually abutting surfaces are provided on said plug and said receptacle for permitting engagement thereof in a plurality of different relative positions less than the number of said sides.

6. The combination claimed in claim 5 wherein
said lockout means comprises segments of insulating material located on said receptacle and said plug so as to abut prior to engagement in other than said permitted positions.

7. The combination claimed in claim 6 wherein
one of said segments is located in all but two of said sides of said array on one of said plug and said receptacle;
one of said segments is located in one of said sides of said array on the other of said plug and said receptacle;
whereby said plug and said receptacle can be engaged only when said one side is aligned with one of said two sides.

8. The combination claimed in claim 5 wherein
said receptacle member comprises a plurality of sidewalls defining a reentrant opening;
said receptacle connectors comprise a plurality of conductive elements disposed within said opening;
said plug member comprises a base portion from which said plug connectors extend;
said raised portions of said receptacle member comprise wall segments extending inwardly from said sidewalls; and
said raised portion of said plug member comprises a wall segment extending along one side of said array so as to be parallel to one of said sidewalls when said plug and said receptacle are aligned for interconnection.

9. The combination claimed in claim 8 wherein
said receptacle connectors comprise a plurality of male contacts of substantially the same height as said sidewalls;
said plug connectors comprise a plurality of female contacts of substantially the same height as said sidewalls;
whereby said base of said plug fits against said sidewalls to enclose said connectors when said plug and receptacle are engaged.

10. In combination, an electrical plug and receptacle adapted for mutual interconnection in singular relationship wherein:
said receptacle comprises:
an insulating receptacle body member;
a symmetric array of receptacle connectors disposed within said receptacle member, said array comprising a plurality of connectors on an outer boundary of said array and at least one connector located within said boundary;
said receptacle member including raised portions of insulating material located between each of said connectors on said boundary except one and said inner connectors;
said plug comprises:
an insulating plug body member;
an array of plug connectors disposed in said plug member and including inner plug connectors arranged to engage said inner receptacle connectors and outer plug connectors arranged to engage at least some of said boundary receptacle connectors;
said plug member including a raised portion between one of said outer plug connectors and said inner plug connectors;
whereby said plug and said receptacle can only be engaged when said raised portion of said plug member is aligned with said boundary receptacle connector which is not separated from said inner connectors by one of said raised receptacle member portions.

11. The combination claimed in claim 10 wherein
said receptacle member comprises a plurality of sidewalls defining a reentrant opening;
said receptacle connectors comprises a plurality of conductive elements disposed within said opening; and
said plug member comprises a base portion from which said plug connectors extend.

12. The combination claimed in claim 11 wherein
said raised portions of said receptacle member comprise wall segments extending transversely to a line between said inner receptacle connectors and the respective boundary connector; and
said raised portion of said plug member comprises a segment extending along a line between said inner plug connectors and one of said outer plug connectors.

13. The combination claimed in 10 wherein
said inner plug connectors are shorter than said outer plug connectors whereby said outer plug connectors contact the respective receptacle connectors before said inner plug connectors.

14. The combination claimed in claim 12 wherein
said receptacle includes four connectors on said boundary and one inner connector;
said receptacle member includes raised portions between three of said boundary connectors and said inner connector.

15. The combination claimed in claim 14 wherein
said base portion of said plug body member includes insulating extensions coextensive with said reentrant opening in said receptacle to prevent the possibility of contact to the remaining connectors while said plug and receptacle are engaged.

16. In a lawn mower including means for cutting grass, an electric motor coupled to said cutting means and having input terminals, a battery having output terminals for supplying power to said mower and means for connecting said output terminals to said input terminals in a forward and in a reverse sense, the improvement comprising:
a receptacle including a plurality of receptacle connectors;
means connecting said input terminals of said motor to a first pair of said connectors;
means connecting said output terminals of said battery to a second pair of said connectors;
plug means for engagement with said receptacle in either of two positions, said plug means including:
two pairs of plug connectors, each of said plug connectors being arranged to contact one of said receptacle connectors when said plug means and said receptacle are engaged; and
means for completing a series connection between said plug connectors in each of said pairs;
whereby said plug means and said receptacle are engageable only when said plug connectors in each of said pairs are respectively connected through said receptacle to one of said input terminals and one of said output terminals.

17. A lawn mower as claimed in claim 16 wherein
lockout means are provided on said plug means and said receptacle for preventing engagement thereof except when said pairs are connected as stated.

18. A lawn mower as claimed in claim 17 wherein
said lockout means comprises segments of insulating material located on said receptacle and said plug means so as to abut prior to engagement in other said permitted patterns.

19. A lawn mower as claimed in claim 18 wherein
said receptacle connectors and said plug connectors are arranged in corresponding symmetric multispeed arrays;
one of said segments is located in all but two of said sides of said array on one of said plug means and said receptacles;
one of said segments is located in one of said sides of said array on the other of said plug means and said receptacles;
whereby said plug means and said receptacle can be engaged only when said one side is aligned with one of said two sides.

20. In combination, a lawn mower as claimed in claim 16, means for recharging said battery, and means for preventing operation of said motor during recharging of said battery comprising
second plug means for engagement with said receptacle, said second plug means including at least a pair of connectors;
means connecting said recharging means to said connectors;
said second plug connectors having the same location in said second plug as said second pair of connectors in said receptacle; and
lockout means included in said receptacle and said second plug for permitting engagement thereof only in one relative orientation of said second plug with said receptacle.

21. The combination claimed in claim 20 wherein
said lockout means in said receptacle and said second plug comprises raised portions of insulating material located on said receptacle and said second plug so as to abut prior to engagement in other than said permitted pattern.

22. The combination claimed in claim 21 wherein
said connectors in said receptacle are arranged in a symmetric array;
one of said raised portions is located between one of said connectors and each other adjacent connector except one, said raised portions being transverse to a line extending between said connectors;
said second plug connectors are arranged in an array corresponding to a portion of said receptacle array;
one of said raised portions being located on said second plug and extending along a line between two of said connectors;
whereby said second plug can only be engaged with said receptacle when said raised portion on said plug is aligned with said one connector and said other adjacent connector.

23 Apparatus for sharpening an electrically driven lawn mower, which includes blade and bed knife means, an electric motor and a battery, by reversing the connection of said motor and said battery comprising
input terminals connected to said motor;
output terminals connected to said battery;
a receptacle including a plurality of connectors;
means connecting said input terminals of said motor to a first pair of said connectors;
means connecting said output terminals of said battery to a second pair of said connectors;
plug means for engagement with said receptacle including two pairs of plug terminals, each of said plug terminals being arranged to contact one of said connectors when said plug and said receptacle are engaged;
means for completing a series connection between said plug terminals in each of said pairs, and
lockout means included in said plug and said receptacle for permitting engagement thereof only when said plug terminals in each of said pairs respectively contact one of said input terminals and one of said output terminals;
said motor being connected in a forward direction in one permitted pattern of engagement so that said blade and bed knife means is operative to cut grass therebetween;
said motor being connected in a reverse direction in another permitted pattern of engagement so that said blade means is driven in a reverse direction for sharpening against said bed knife upon completion of a closed circuit between said battery and said motor.

24. Apparatus providing for mutually exclusive engagement of distinct-function plugs with a multifunction receptacle comprising
a receptacle comprising
an insulating receptacle body member;
a symmetric, multispeed array of electrical connectors disposed in said receptacle member, at least two of said connectors being on the boundary of said array and at least one being within said boundary;
said receptacle member including raised portions of insulating material located in all but two of said sides of said array; and
a first plug comprising
an insulating plug body member shaped to be engaged with said receptacle;
a plurality of electrical connectors in said plug member, said connectors being disposed in an array corresponding to that of said receptacle connectors;
said plug member including a raised portion of insulating material disposed along one side of said array of plug connectors and arranged to prevent engagement of said plug and receptacle if said plug portion encounters one of said receptacle portions;
whereby said first plug and said receptacle can be interconnected in only two relative positions;
said receptacle member also including raised portions of insulating material located between each of said connectors on said boundary except one and said inner connectors;
a second plug comprising
an insulating plug body member;
an array of plug connectors disposed in said plug member and including at least one inner plug connector arranged to connect said inner receptacle member and including inner plug connectors arranged to engage said inner receptacle connectors and two outer plug connectors arranged to engage only two of said boundary receptacle connectors;
said plug member including a raised portions between one of said outer plug connectors and said inner plug connectors;
whereby said second plug and said receptacle can only be engaged when said raised portion of said plug member is aligned with said boundary receptacle connector which is not separated from said inner connectors by one of said raised receptacle member portions; and
both of said plugs having a configuration relative to said receptacle which prevents engagement of both plugs simultaneously.

25. Apparatus as claimed in claim 24 wherein each of said plug body members is of substantially the same outer configuration as said receptacle.